(12) United States Patent
Camiolo et al.

(10) Patent No.: US 11,309,799 B2
(45) Date of Patent: Apr. 19, 2022

(54) POWER SUPPLY DEVICE

(71) Applicant: STMICROELECTRONICS (GRENOBLE 2) SAS, Grenoble (FR)

(72) Inventors: Jean Camiolo, St Egrêve (FR); Alexandre Pons, Vizille (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 76 days.

(21) Appl. No.: 16/880,876

(22) Filed: May 21, 2020

(65) Prior Publication Data
US 2020/0373843 A1 Nov. 26, 2020

(30) Foreign Application Priority Data
May 24, 2019 (FR) ...................................... 1905489

(51) Int. Cl.
*H02M 3/158* (2006.01)
*H02M 1/08* (2006.01)
*H02M 1/00* (2006.01)

(52) U.S. Cl.
CPC ........... *H02M 3/1588* (2013.01); *H02M 1/08* (2013.01); *H02M 1/0032* (2021.05)

(58) Field of Classification Search
CPC .... H02M 3/1588; H02M 1/08; H02M 1/0032; H02M 1/0025; H02J 2207/30; H02J 7/00047; G06F 1/26; G06F 1/266; G06F 2213/0042; G05F 1/575
See application file for complete search history.

(56) References Cited

U.S. PATENT DOCUMENTS

| | | | |
|---|---|---|---|
| 11,014,182 B2 * | 5/2021 | Henry | ................... B23K 9/093 |
| 2013/0049720 A1 | 2/2013 | Nien et al. | |
| 2018/0083549 A1 | 3/2018 | Yao et al. | |
| 2021/0067046 A1 * | 3/2021 | Adragna | ................. H02M 1/08 |
| 2021/0247788 A1 * | 8/2021 | Chen | .................... H02M 3/158 |

FOREIGN PATENT DOCUMENTS

EP 3 200 335 A1 8/2017

OTHER PUBLICATIONS

STMicroelectronics, "High frequency single phase PWM controller with Power Good," product datasheet, L6728AH, May 2009, 33 pages.
STMicroelectronics, "Two-Phase Interleaved DC/DC Controller," product datasheet, L6712A, Jun. 2005, 29 pages.

* cited by examiner

*Primary Examiner* — Kyle J Moody
(74) *Attorney, Agent, or Firm* — Seed IP Law Group LLP

(57) ABSTRACT

The present disclosure concerns a device comprising: a voltage converter supplying, from a first DC voltage, a second DC voltage on an output terminal of the converter having a current value determined by a third voltage on a control terminal of the converter; a circuit configured, when a set point value of the second voltage switches from a first to a second set point value smaller than the first value, to generate a ramp signal successively representative of the first value, of a plurality of decreasing intermediate values between the first and second values, and of the second value; and an amplifier supplying a first signal representative of a difference between the ramp signal and a signal representative of the current value of the second voltage, the third voltage being determined by the first signal.

20 Claims, 4 Drawing Sheets

POWER SUPPLY DEVICE

BACKGROUND

Technical Field

The present disclosure generally relates to devices for supplying, from a power source, a supply power to a load. The application more particularly concerns a power supply interface connected between a power source and a USB-C-type connector, the connector being intended to be electrically coupled to a load to be powered, particularly by a USB-C-type cable.

Description of the Related Art

Although, currently, wireless connection is one of the main research axes in the field of power and data exchange, cables still seem to be the most reliable way to connect a plurality of electronic devices, be it to exchange data or to power or charge one or a plurality of electronic devices.

Among the different types of cables and connectors of the USB standard, the USB-C type is one of the types which enables to exchange data and power. The USB-PD technology (PD standing for "Power Delivery") is a technology which adapts on USB-C-type cables and connectors. Such a technology enables to manage the powering of electronic devices.

BRIEF SUMMARY

It would be desirable to be able to at least partly improve certain aspects of devices for supplying, from a power source, a supply power to a load via a cable, particularly via a USB-C cable adapted to the USB-PD technology.

An embodiment overcomes all or part of the disadvantages of known devices for supplying, from a power source, a supply power to a load.

An embodiment provides a device comprising:
  a voltage converter configured to supply, from a first DC voltage, a second DC voltage on an output terminal of the converter having a current value determined by a third voltage on a control terminal of the converter;
  a circuit configured, when a set point value of the second voltage switches from a first set point value to a second set point value smaller than the first value, to generate a first ramp signal successively representative of the first set point value, of a plurality of decreasing intermediate values between the first and second set point values, and of the second set point value; and
  an error amplifier configured to supply a second signal representative of a difference between the first signal and a third signal representative of the current value of the second voltage, the third voltage being determined by the second signal.

According to an embodiment, the first and second set point values are selected from a set of predefined set point values.

According to an embodiment, the first set point value is smaller than a predefined set point value selected from a set of predefined set point values, the first set point value being determined from the selected predefined set point value, and the second set point value being selected from said set.

According to an embodiment, the first set point value is further determined from a difference between a current available on the output terminal of the converter and a predefined maximum current.

According to an embodiment, said circuit is configured, when the set point value of the second voltage switches from the first set point value to the second set point value, to:
  store a fourth signal representative of the first set point value;
  generate a fifth ramp signal successively representative of said selected predefined set point value, of a plurality of decreasing intermediate values between the selected predefined set point value and the second set point value, and of the second set point value; and
  generate the first signal equal to the fourth signal until the fifth signal is equal to the fourth signal, and then equal to the fifth signal.

According to an embodiment, the circuit comprises a comparator configured to supply a sixth signal representative of the comparison of the fourth signal with the fifth signal.

According to an embodiment, the circuit is configured to determine the first signal from the fourth, fifth, and sixth signals.

According to an embodiment:
  a voltage dividing bridge is connected between the output terminal of the converter and a node of application of a reference potential, an intermediate node of said bridge being connected to the control terminal of the converter; and
  a transistor is connected between the intermediate node of said bridge and the node of application of the reference potential, a control terminal of the transistor being configured to receive the second signal.

According to an embodiment, the circuit comprises a control unit and a digital-to-analog converter.

According to an embodiment, the control unit is configured to, when the set point value of the second voltage switches from the first set point value to the second set point value, successively supply binary control codes to the analog-to-digital converter, said codes being representative respectively of the first set point value, of said decreasing intermediate values, and of the second set point value, the first signal being available on an output terminal of the digital-to-analog converter.

According to an embodiment, the control unit is configured to, when the set point value of the second voltage switches from the first set point value to the second set point value, successively supply binary control codes to the analog-to-digital converter, said codes being representative respectively of said selected predefined set point value, of said plurality of decreasing intermediate values between the selected predefined set point value and the second set point value, and of the second set point value, the fifth signal being available on an output terminal of the digital-to-analog converter.

According to an embodiment:
  the output terminal of the digital-to-analog converter is coupled to a first internal node by a first switch;
  a capacitor is connected to the first internal node; and
  the fourth signal is available on a second internal node coupled to the first internal node by a second switch, the first signal being available on the first internal node.

According to an embodiment, the control circuit is configured to:
  turn off the second switch when the set point value of the second voltage switches from the first set point value to the second set point value; and
  turn on the first switch when the fifth signal becomes equal to the fourth signal.

A further embodiment provides an interface of connection between a power source and a USB-C connector, the interface comprising the device as described, wherein the first voltage is supplied by the power source, the second voltage being intended, when a load is coupled to the USB-C connector, to power said load.

A further embodiment provides a method of controlling a voltage converter supplying, from a first DC voltage, a second DC voltage having a current value determined by a third voltage, the method comprising, when a set point value of the second voltage switches from a first set point value to a second set point value smaller than the first set point value, the steps of:

generating, by means of a circuit, a first ramp signal successively representative of the first set point value, of a plurality of decreasing intermediate values in the range from the first and second set point values, and of the second set point value;

supplying, by means of an error amplifier, a second signal representative of a difference between the first signal and a third signal representative of the current value of the second voltage; and determining the third voltage from the second signal.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
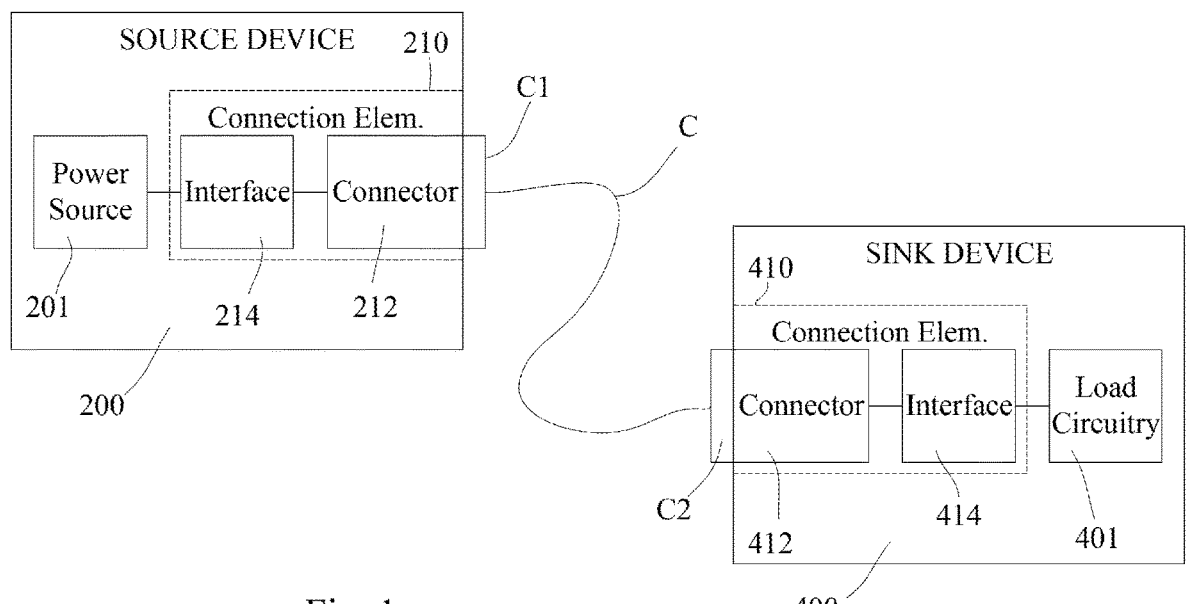
FIG. 1 is a simplified view illustrating a connection between a power source and an electronic device.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the management of a phase of negotiation relative to the supply power to be supplied to a load from a power source is not detailed. Further, only the relevant aspects of the USB-C and USB-PD technologies are described, the other aspects adapting with no modifications. In particular, the function of data exchange via connectors, and possibly a USB-C-type cable, preferably adapted to the USB-PD technology, is not described, the described embodiments being compatible with the usual data exchange function of the USB-C and USB-PD technologies.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

FIG. 1 is a simplified view illustrating a power transmission between an electronic device 200 having the role of a power source (SOURCE) and an electric device to be powered 400 having the role of a load (SINK). Devices 200 and 400 are connected via a cable C of USB-C type, in the present example adapted to the USB-PD or USB "Power Delivery" technology.

Device 200 comprises an electric power source 201. Power source 201 is, for example, the mains or a DC power supply. In the following description, it is considered that device 200 comprises a DC power source 201, device 200 being, for example, a computer, a portable battery, etc. or any other electronic device capable of powering a device and/or of charging a battery.

Cable C comprises, at each of its ends, a USB-C-type connector C1, C2, in the present example adapted to the USB-PD technology. Connectors C1, C2 are generally identical.

The source device 200 includes a connection element 210 comprising a connection interface 214 and a connector 212. Interface 214 couples source 201 to connector 212. The connector 212 is configured to cooperate with the connector C1 of cable C.

Similarly, the load device 400 includes a connection element 410 comprising a connection interface 414 and a connector 412. The connection interface 414 couples the connector 412 to load circuitry 401. The connector 412 is configured to cooperate with the connector C2 of cable C.

Interfaces 214, 414 are generally identical. Connection interfaces 214, 414 enable to adapt the power supplied by power source 201 according to the power used by the load circuitry 401 of the load 400. More particularly, in the following description, connection 214, 414 enable to adapt the power supplied by power source 201 according to a set point of the supply power used by the load circuitry 401 of the load device 400, particularly in the case where the USB-PD technology is implemented. For this purpose, interface 214 comprises a power converter (not shown in FIG. 1), preferably a DC/DC voltage converter, controlled to adapt, from power source 201, the power supplied to load 400.

In a connection managed by the USP-PD technology, a communication is established between devices 200 and 400 to determine the electrical supply power for device 400 to be powered and/or charged. More particularly, device 400 may indicate, for example, via its interface 414, a minimum power for its operation and device 200 indicates, for example, via its interface 214, the power supply levels that it is capable of supplying. A negotiation, in the present example managed by the USB-PD technology, then starts to define the power that the device 200 will supply to the device 400. Once the negotiation is over, connection interface 214 adapts the supply power of power source 201 according to the result of the negotiation, after which the power supply to the device 400 starts. The voltage converter of interface 214 is then controlled in accordance with the result of the negotiation, to adapt the power of power source 201 to the negotiated power, for example, by adapting the voltage delivered by the converter according to the negotiated power.

Preferably, the negotiated supply power is selected from a list of predefined power supply levels. The list is, for example, recorded in interface 214. Preferably, the list is defined by a standard. Each predefined supply power level may be characterized by a plurality of values, particularly by a predefined value of the voltage and, possibly, by a predefined minimum value of the current corresponding to the predefined power. In the USB-PD technology, each set of values characterizing a predefined power supply level in the list corresponds to a set of information designated by initials PDO ("Power Data Object"), where such PDO sets of information can be transmitted between devices 200 and 400 adapted to the USB-PD technology to define, during a negotiation, which of the predefined power levels the device 200 should deliver to load 400.

In the following description, the case of a reduction of a set point value of the voltage delivered by the converter of the interface 214 is considered. Such a reduction of the set point value of the voltage delivered by the converter may result in particular from a renegotiation of the power that the device 200 may supply to the load, a disconnection of the cable C, or a resetting of the interface following the detection of a failure in the interface operation. As an example, following the disconnection of the cable C or the resetting of the interface, the set point value of the voltage delivered by the converter changes to a default value, for example, 5 V.

In the following description, it is considered that interface 214 comprises an error amplifier having its output signal or voltage representative of the difference between a signal or voltage representative of the set point value of the voltage delivered by the converter and a signal representative of the voltage effectively available at the converter output. It is further considered that the converter is controlled by a control signal or voltage depending on the output signal of the amplifier, that is, by a control signal or voltage determined by the output signal of the amplifier. In this case, when the set point value of the converter output voltage switches from a first set point value to a second smaller set point value, this may cause unwanted variations of the converter control signal. Such unwanted variations of the control signal may cause a deterioration, a destruction, or a malfunction of the converter.

As an example, such variations may occur when the control voltage of the converter is available on an intermediate node of a voltage dividing bridge, preferably resistive, connected between the converter output and a node of application of a reference potential, and a transistor controlled by the output voltage of the error amplifier is connected between the intermediate node and the node of application of the reference potential. Indeed, when the set point value of the converter output voltage switches from a first set point value to a second smaller set point value, the error amplifier may saturate and cause a blocking of the transistor, which results in an overvoltage on a control terminal of the converter receiving the control voltage.

To suppress unwanted variations of the converter control signal, when the set point value of the output voltage of the converter switches from the first set point value to the second set point value, the inventors here provide for the signal representative of the set point value of the output voltage of the converter not to directly switch, abruptly, from a first state representative of the first set point value to a second state representative of the second set point value. More particularly, the inventors provide an embodiment of an interface where, when the set point value of the output voltage of the converter switches from the first set point value to the second set point value, the signal or voltage representative of such set point value is a ramp (such as a staircase) successively representative of a plurality of intermediate decreasing values between the first and second set point values of the output voltage of the converter.

Figure 2:
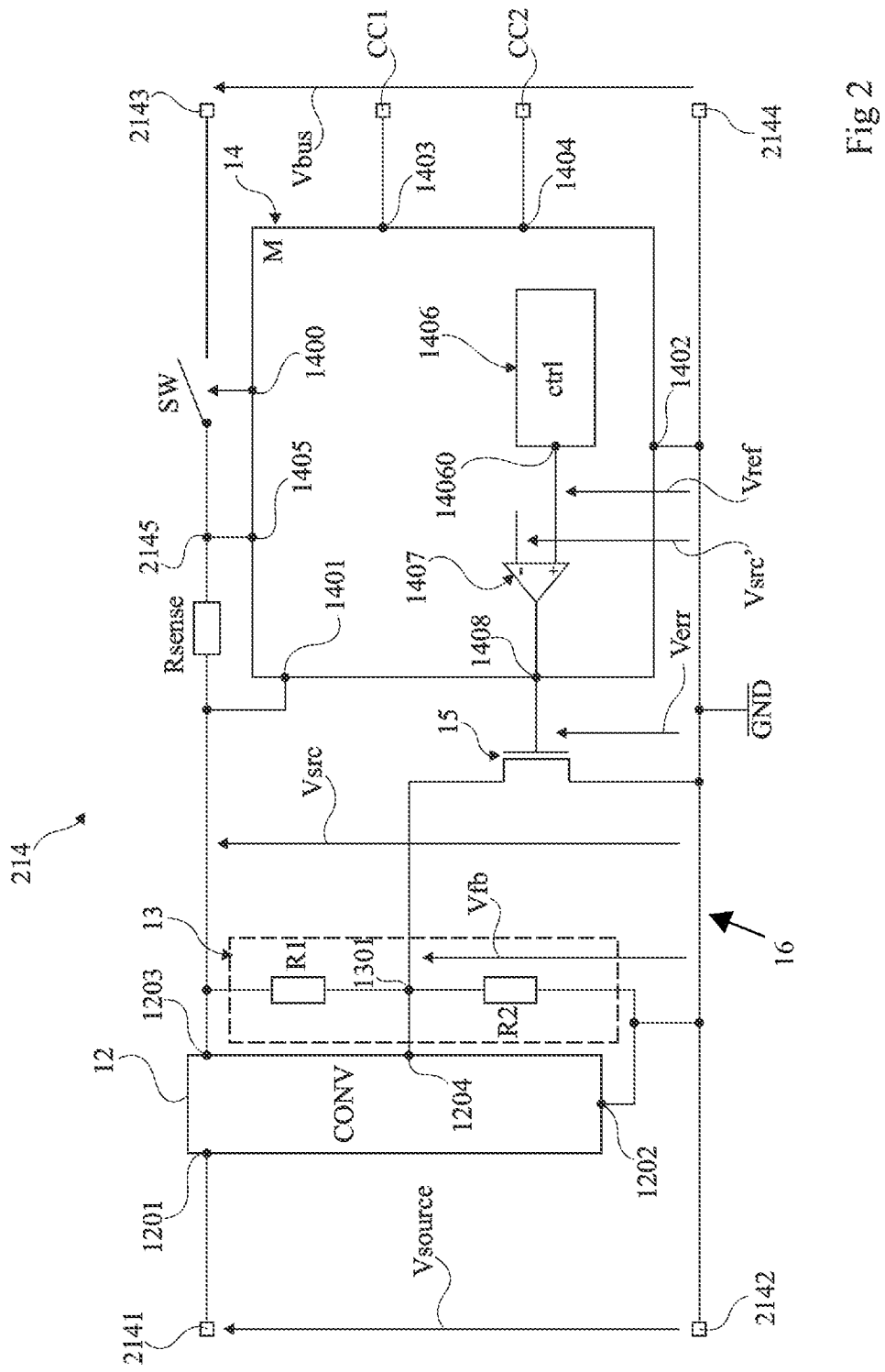
FIG. 2 is a simplified view illustrating an embodiment of an electronic device for supplying an electric power supply to the electronic device of FIG. 1.

FIG. 2 is a simplified view illustrating an embodiment of an electronic device for supplying, from the power source 201 of FIG. 1, a supply power to electronic device 400 of FIG. 1. More particularly, FIG. 2 schematically shows an embodiment of a circuit of USB-C-type connection interface 214, in the present example adapted to the USB-PD technology, where interface 414 may be identical to interface 214.

Interface 214 comprises at least two input terminals 2141, 2142 connected to power source 201 (not shown). A DC voltage Vsource of power source 201 is applied between terminals 2141 and 2142, voltage Vsource being referenced with respect to a reference potential on terminal 2142, typically ground GND. Interface 214 further comprises a first output terminal 2143 supplying a DC power supply voltage Vbus, referenced with respect to a second output terminal 2144 at potential GND. The interface also comprises at least one communication terminal. These output and communication terminals are all intended to be coupled to the corresponding connector 212 (not shown), which then allows the connection to device 400, for example, via connector C1, cable C, and connector C2, as shown in FIG. 1. In this embodiment, interface 214 comprises two communication terminals CC1, CC2. An advantage of having two communication terminals is that, in the case where the terminals are symmetrically positioned on connector 212, this enables to manufacture a reversible connector C1, that is, a connector C1, for example, rectangular, which may be coupled to connector 212 in a first direction and in a second direction inverse to the first one.

Interface 214 comprises a voltage converter (CONV) 12, a switch SW, and a control unit or circuit (M) 14.

Converter 12 is, in this example, a DC/DC voltage converter capable of converting DC voltage Vsource into a DC voltage Vsrc. Converter 12 comprises:
- an input terminal 1201 intended to receive voltage Vsource, terminal 1201 being coupled, preferably connected, to terminal 2141;
- an input terminal 1202 intended to receive the reference potential, terminal 1202 being coupled, preferably connected, to terminal 2142;
- an output terminal 1203 supplying the converted or adapted voltage Vsrc, terminal 1203 being coupled to terminal 2143; and
- a control terminal 1204 receiving a control or feedback signal Vfb, signal Vfb corresponding, in this example, to the voltage between terminals 1204 and 1202.

Switch SW has one of its terminals coupled to terminal 1203 of converter 12, its other terminal being coupled, preferably connected, to the output terminal 2143 supplying voltage Vbus. In this embodiment, switch SW is controlled by control unit 14, and more particularly by a control signal supplied by a terminal 1400 of unit 14. When switch SW is off, output terminal 1203 of the converter is electrically isolated from output terminal 2143 of the interface or, in other words, converter 12 is electrically isolated from a possible load 400 coupled to interface 214.

Unit 14 comprises one or a plurality of communication terminals coupled, preferably connected, to communication terminal(s) CC1, CC2 of interface 214. In this example, unit 14 comprises two terminals 1403, 1404 connected to the respective terminals CC1 and CC2.

In this embodiment, control unit 14 is powered with voltage Vsrc and comprises a terminal 1401 coupled, preferably connected, to terminal 1203 of converter 12, and a terminal 1402 coupled, preferably connected, to potential GND (terminals 2142 and 2144).

Unit 14 is configured to observe the value of voltage Vsrc supplied by converter 12, in this example, received on its terminal 1401.

According to an embodiment, unit 14 is configured to observe the current supplied by the converter. More particularly, in this example, interface 214 comprises a resistor Rsense connected between terminal 1203 of converter 12 and a node 2145 connected to the switch SW, the node 2145 being then coupled, preferably connected, to a terminal 1405 of unit 14.

Unit 14 comprises a processing circuit 1406 (ctrl), for example, comprising a state machine, a microprocessor, a programmable logic circuit, etc.

Circuit 1406 is configured to select a predefined power from the list of predefined supply powers.

Circuit 1406 is further configured to supply the control signal of switch SW.

Circuit 1406 is also configured to supply a signal Vref, for example, a voltage, representative of a set point value of voltage Vsrc, the set point value being, for example, partly determined by the selected predefined power. Voltage Vref is available on a terminal 14060 of circuit 1406.

Unit 14 further comprises an error amplifier 1407, the feedback loop of which has not been shown. Error amplifier 1407 is configured to supply a signal Verr, here a voltage, representative of the difference between the value of voltage Vsrc and its set point value. Signal Verr is supplied to an output terminal 1408 of circuit 14.

More particularly, according to the illustrated embodiment, amplifier 1407 is configured to supply a voltage Verr equal to the difference between a voltage Vscr', representative of the current value of voltage Vscr, and voltage Vref representative of the set point value of voltage Vsrc. Thus, an input terminal of amplifier 1407 is coupled, preferably connected, to terminal 14060 of circuit 1406, the other input terminal of amplifier 1407 receiving voltage Vsrc' and the output terminal of amplifier 1407 supplying voltage Verr. Voltage Verr is available on output terminal 1408 of unit 14.

In this example, voltage Vsrc' varies like voltage Vsrc, that is, it increases, respectively, decreases, when voltage Vsrc increases, respectively decreases. Further, voltage Vref varies like the set point value that it represents, that is, when the set point value of voltage Vsrc increases, respectively decreases, voltage Vref increases, respectively decreases.

In this example, voltage Vref is applied to the non-inverting terminal or input (+) of error amplifier 1407, voltage Vsrc' being applied to the inverting terminal or input (−) of error amplifier 1407. Thus, when voltage Vref decreases faster than voltage Vsrc', voltage Verr decreases.

As previously indicated, control voltage Vfb of converter 12 depends on voltage Verr or, in other words, is determined by voltage Verr. Voltage Vfb further depends on the value of voltage Vsrc supplied by converter 12.

More particularly, in this embodiment, interface 214 comprises a feedback control circuit 16 that includes a voltage dividing bridge 13 (in dotted lines in FIG. 2), in this example a resistive voltage dividing bridge, and a transistor 15, preferably a MOS transistor. Voltage dividing bridge 13 is connected between terminal 1203 of converter 12 and a node of application of reference potential GND (terminals 2142 and 2144). An intermediate node 1301 of bridge 13 is connected to terminal 1204 of converter 12. Voltage Vfb is available at node 1301.

In this example, bridge 13 comprises two resistors R1 and R2 series-connected between terminals 1203 and 2142. Resistor R1 is connected to terminal 1203, resistor R2 being connected to terminal 2142, and node 1301 corresponding to the connection node between resistors R1 and R2.

Transistor 15 is connected between node 1301 and a node at reference potential GND (terminals 2141 and 2144). A control terminal of transistor 15 receives signal Verr and is thus coupled, preferably connected, to terminal 1408 of unit 14. In this example, transistor 15 has an N channel, its source being coupled, preferably connected, to the node of application of potential GND and its drain being coupled, preferably connected, to node 1301.

Although this is not shown in FIG. 2, the converter comprises, between its terminals 1203 and 1202, an output capacitor across which voltage Vsrc is available. The output capacitor of converter 12, and possible other components of converter 12 such as an inductance, other capacitors, and/or one of a plurality of resistors, may be arranged outside of converter 12, in interface 214.

The operation of interface 214 will now be described.

After a negotiation or renegotiation phase, a predefined power has been selected among the list of predefined supply powers. The selected predefined power determines a set point value of voltage Vsrc. Circuit 1406 then supplies signal Vref representative of the set point value.

When the value of voltage Vsrc is constant and equal to its set point value, the difference between voltages Vsrc' and Vref is constant, whereby voltage Verr has a constant non-zero value. Transistor 15 then draws a substantially constant non-zero current from node 1301. The value of voltage Vfb is thus constant and imposed by the value of voltage Vsrc, therefore by the converter. More particularly, the constant value of voltage Vfb is determined by the value of voltage Vsrc, the value of the current drawn by the transistor 15 and the values of resistors R1, R2 of bridge 13.

When the value of voltage Vsrc becomes distant from its set point value, for example, increases with respect to the set point value, this causes a corresponding variation of voltage Vsrc', and thus of the difference between voltages Vscr' and Vref. The value of voltage Verr is correspondingly modified, whereby the current drawn from node 1301, and thus voltage Vfb, are modified. Such a modification of voltage Vfb controls converter 12 to bring the value of voltage Vsrc back to its set point value.

While interface 214 is in operation, for example, in steady state, it is considered that a disconnection of cable C (FIG. 1), a renegotiation towards lower values of the voltage to be supplied by device 200 to load 400, or a resetting of interface 214, occurs. More generally, it is considered that the set point value of voltage Vsrc is switched from a first set point value Vsrc1, for example, selected in a list or a set of predefined set point values, to a second set point value Vsrc2, smaller than value Vsrc1, for example, selected in the set of predefined set point values.

In this embodiment, instead of abruptly switching voltage Vref from a first value Vref1 representative of set point value Vsrc1 to a second value Vref2 representative of set point value Vsrc2, circuit 1406 is configured to supply a voltage ramp Vref, decreasing in the present example, between values Vref1 and Vref2. Circuit 1406 then operates as a ramp generator. Thus, voltage Vref is successively representative of set point value Vsrc1, of a plurality of decreasing intermediate values, and of set point value Vsrc2, the intermediate values being between set point values Vsrc1 and Vsrc2. The lack of an abrupt change of voltage Vref enables to ensure that, on changing of set point value of voltage Vsrc, the error amplifier operates in regulation mode, that is, the error amplifier does not saturate. As long as amplifier 1407 operates in regulation mode, voltage Vref is non-zero and transistor 15 keeps on drawing current from node 1301, the voltage Vfb then being constant when the voltage Vsrc is constant and equal to its set point value.

In the absence of such a voltage ramp Vref, that is, if circuit 1406 switched, in all or nothing, voltage Vref from value Vref1 to value Vref2, amplifier 1407 would no longer operate in regulation mode and its output voltage Verr would become zero. A zero voltage Verr would turn off transistor 15, resulting in a voltage peak, or overvoltage, on control voltage Vfb of converter 12. Such an overvoltage on terminal 1204 should be avoided since it might cause a malfunction of converter 12, for example, because voltage Vfb exceeds a threshold beyond which converter 12 enters a configuration phase. Such an overvoltage on terminal 1204 may even cause a deterioration, or even a destruction of converter 12.

Preferably, in a change of the set point value of voltage Vsrc, from value Vsrc1 to value Vscr2 lower than value Vscr1, unit 14, for example, circuit 1406, is configured to turn switch SW off and to turn on another switch (not shown) enabling to discharge voltage Vsrc to ground GND, through a discharge resistor (not shown), to decrease the value of voltage Vsrc. In practice, voltage Vsrc corresponds to the voltage across the filtering or output capacitor (not shown) of converter 12. Thus, voltage Vsrc discharges at a speed conditioned by value R of the discharge resistor and by value C of the output capacitor of converter 12. It is within the abilities of those skilled in the art, based on the above functional indications and particularly on a time constant equal to the product of values R and C, to determine the maximum slope of voltage Vref between values Vref1 and Vref2 to ensure that amplifier 1407 operates in regulation mode for the entire duration of the ramp. Preferably, the slope of the ramp of voltage Vref between values Vref1 and Vref2 is determined from time constant R.C to avoid exceeding, in absolute value, the slope of voltage Vsrc'.

Figure 3:
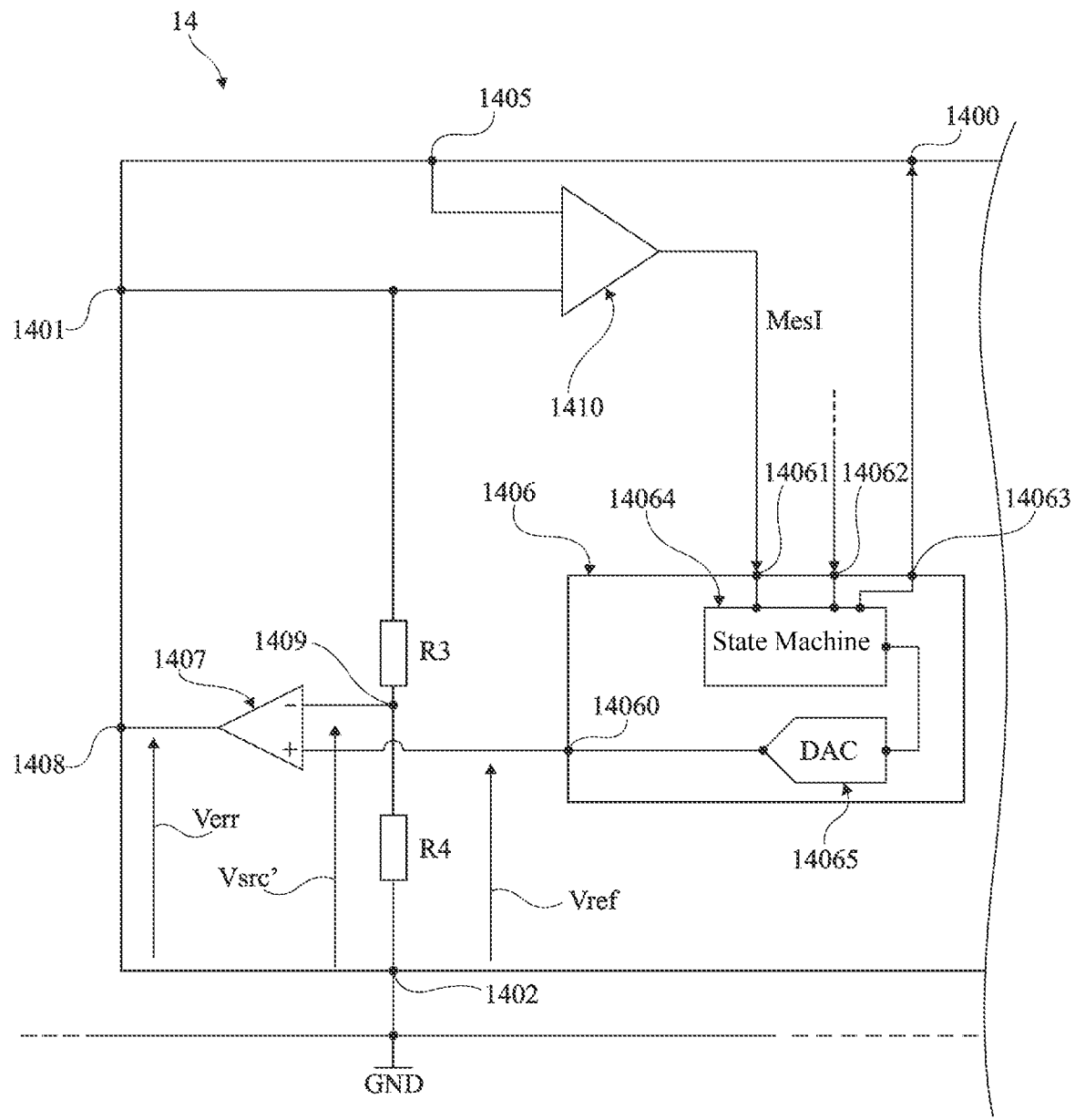
FIG. 3 shows in more detailed fashion an embodiment of a portion of the power supply device of FIG. 2.

FIG. 3 shows in more detailed fashion a portion of interface 214 of FIG. 2 according to an embodiment. More particularly, in FIG. 3, only a portion of unit 14 has been shown.

In this embodiment, voltage Vsrc' representative of the value of voltage Vsrc is available on a node 1409 of connection between two resistors R3 and R4 series-connected between terminals 1401 and 1402 of unit 14.

Further, according to an embodiment, unit 14 comprises an amplifier 1410 having its input terminals respectively connected to terminals 1401 and 1405 of unit 14 and having its output terminal supplying a signal MesI representative of the current supplied by converter 12 (FIG. 2), and more particularly by terminal 1203 of converter 12. Signal MesI is supplied to a terminal 14061 of circuit 1406. As a variation, amplifier 1410 may be omitted.

Circuit 1410 may comprise other input terminals intended, for example, to be coupled to a temperature sensor to detect a failure of the interface operation, to terminal 1401 to receive voltage Vsrc, for example, to power circuit 1406, etc. shown herein in the form of a single terminal 14062.

According to an embodiment, circuit 1406 comprises a terminal 14063 connected to terminal 1400 of unit 14 to supply the control signal of switch SW (FIG. 2).

In the illustrated embodiment, circuit 1406 comprises a control circuit or unit 14064. Circuit 14064 comprises in particular a state machine. As an example, circuit 14064 implements the steps for the negotiation of a supply power, circuit 14064 being then coupled to terminals 1403 and 1404 (FIG. 2). In this example, circuit 14064 supplies terminal 1400 of unit 14 with the control signal of switch SW.

In this embodiment, circuit 1406 comprises a digital-to-analog converter (DAC) 14065 having its output supplying voltage Vref. Converter 14065 is controlled by the state machine 14064. In particular, the state machine 14064 is configured, when a set point value of voltage has been selected in the list of predetermined set point values, to supply a digital signal over a plurality of bits, or binary code, to converter 14065 such that the converter supplies voltage Vref representative of the selected predefined set point value of voltage Vsrc.

In this embodiment, when the state machine 14064 implements a change of the set point value of voltage Vsrc, from predefined set point value Vsrc1 to predefined set point value Vsrc2, instead of supplying to converter 14065 a binary code B1 corresponding to value Vref1 of voltage Vref, and then, for example, at a next period T of a clock signal rating the operation of circuit 14064, a binary code B2 corresponding to value Vref2 of voltage Vref, the state machine 14064 successively supplies binary code B1, a plurality of binary codes B, and binary code B2. The binary codes B correspond to intermediate values of voltage Vref, between values Vref1 and Vref2. More particularly, the binary codes B are successively supplied, for example, at each cycle of the clock signal, so that the corresponding intermediate values of voltage Vref are decreasing. Thus, signal Vref exhibits a ramp, and more particularly herein a stepped ramp, decreasing between values Vref1 and Vref2.

Preferably, circuit 14064 updates the binary code supplied to converter 14065 at each period T of its clock signal. Preferably, circuit 14064 successively supplies all the binary codes B between codes B1 and B2.

As a specific example, it is considered that:
the state machine 14064 successively supplies binary codes B1, B, and B2 by changing the value of the code supplied at each period T of the clock signal rating its operation;
each modification of the code supplied to the DAC converter, on successive supply of codes B1, B, and B2, corresponds to a same voltage variation DV of the output voltage of the DAC; and
voltage Vsrc' is equal to Vsrc/A.

In this case, it is made sure that value DV/T is smaller than value (Vsrc2−Vsrc1)/(RC).

An embodiment where the set point value of the voltage Vsrc to be delivered by converter 12 switches from a value Vscr1 to a value Vscr2, both selected from a list of predefined set point values, has been previously described in relation with FIGS. 2 and 3. The predefined set point values of voltage Vsrc are, for example, determined by the list of the predefined supply powers and by a default set point value. As an example, the default set point value corresponds to the lowest predefined set point value of the list of predefined set point values.

In an alternative embodiment, interface 214 described in relation with FIG. 2 operates according to a so-called "constant current" mode.

In this variation, the selection of a predefined power P1 from the list of predefined supply powers amounts to selecting a predefined set point value Vsrc1 of voltage Vsrc and also a maximum output current Imax of converter 12. Voltage Vsrc is then regulated, not only according to its set point value Vsrc1, but also so that the current supplied by the converter does not exceed maximum current Imax.

In this variation, unit 14 is configured to measure the current supplied by converter 12, for example, from the voltage across resistor Rsense (FIG. 2), in the present variation by means of amplifier 1401. When the current supplied by converter 12 exceeds current Imax, unit 14 controls converter 12 so that it supplies a voltage Vsrc to a set point value Vsrc3, smaller than set point value Vsrc1 and determined by the difference between the current supplied by converter 12 and current Imax. For this purpose, unit 14, in the present example circuit 1406, is configured to adjust the value of voltage Vref according to a difference between the current supplied by converter 12 and current Imax, so that voltage Vref takes a value Vref3 representative of set point value Vsrc3. More particularly, value Vref3 is equal to value Vref1 representative of set point value Vsrc1, minus a percentage of value Vref1, this percentage being determined by the difference between the current supplied by converter 12 and current Imax. In other words, value Vref3 is equal to K times value Vref1, K being smaller than 1 and being determined by the difference between the current supplied by converter 12 and current Imax. In this variation, set point value Vsrc3 is not a predefined set point value, conversely to set point values Vsrc1 and Vsrc2.

As an example, unit 14, for example, its circuit 1406, comprises an error amplifier (not shown in FIG. 2) supplying a signal representative of the difference between the current supplied by converter 12 and current Imax, the value Vref3 being determined by the output signal of the error amplifier, voltage Vref being preferably proportional or equal to this output signal.

Further, in the present variation, if the value of voltage Vsrc becomes smaller than a low threshold, unit 14 detects this malfunction and selects the predefined set point value Vsrc2, corresponding preferably, in the present variation, to the default set point value of voltage Vsrc, which causes a change in the set point value of voltage Vsrc from value Vsrc3 to value Vsrc2. Such a low threshold is determined by set point value Vsrc1 or, in other words, by predefined power P1.

As an example, unit 14, for example, its circuit 1406, comprises a comparator (not shown in FIG. 2) between a signal representative of voltage Vsrc and a signal representative of this low threshold, the comparator supplying a binary signal which state '1' or '0' depends on the result of the comparison between the signal representative of voltage Vsrc and the signal representative of the low threshold.

When the set point value changes to Vsrc2, it could then be provided, as previously, for voltage Vref to exhibit a ramp between values Vref1 and Vref2. This would however result in voltage Vref abruptly switching from value Vref3 to value Vref1 before the voltage ramp from value Vref1 to value Vref3. This is not desirable, particularly since voltage Vsrc at the converter output would exhibit a voltage peak.

Thus, in such a variation, it is provided for unit 14, and more particularly for its circuit 1406, to supply voltage Vref with a voltage ramp from value Vref3 to value Vref2, and not from value Vref1 to value Vref2.

Preferably, unit 14, for example, its processing circuit 1406, are configured to store value Vref3, for example, to store value Vref at value Vref3. Circuit 1406 is then configured to supply a voltage ramp Vr from value Vref1 to value Vref2, to compare voltage ramp Vr with the stored voltage Vref3, and to generate voltage Vref from voltage Vr and from the stored voltage Vref3. More particularly, circuit 1406 is configured to generate voltage Vref so that it is equal to Vref3 as long as voltage ramp Vr is greater than voltage Vref3, and that it is equal to voltage Vr afterwards.

Figure 4:
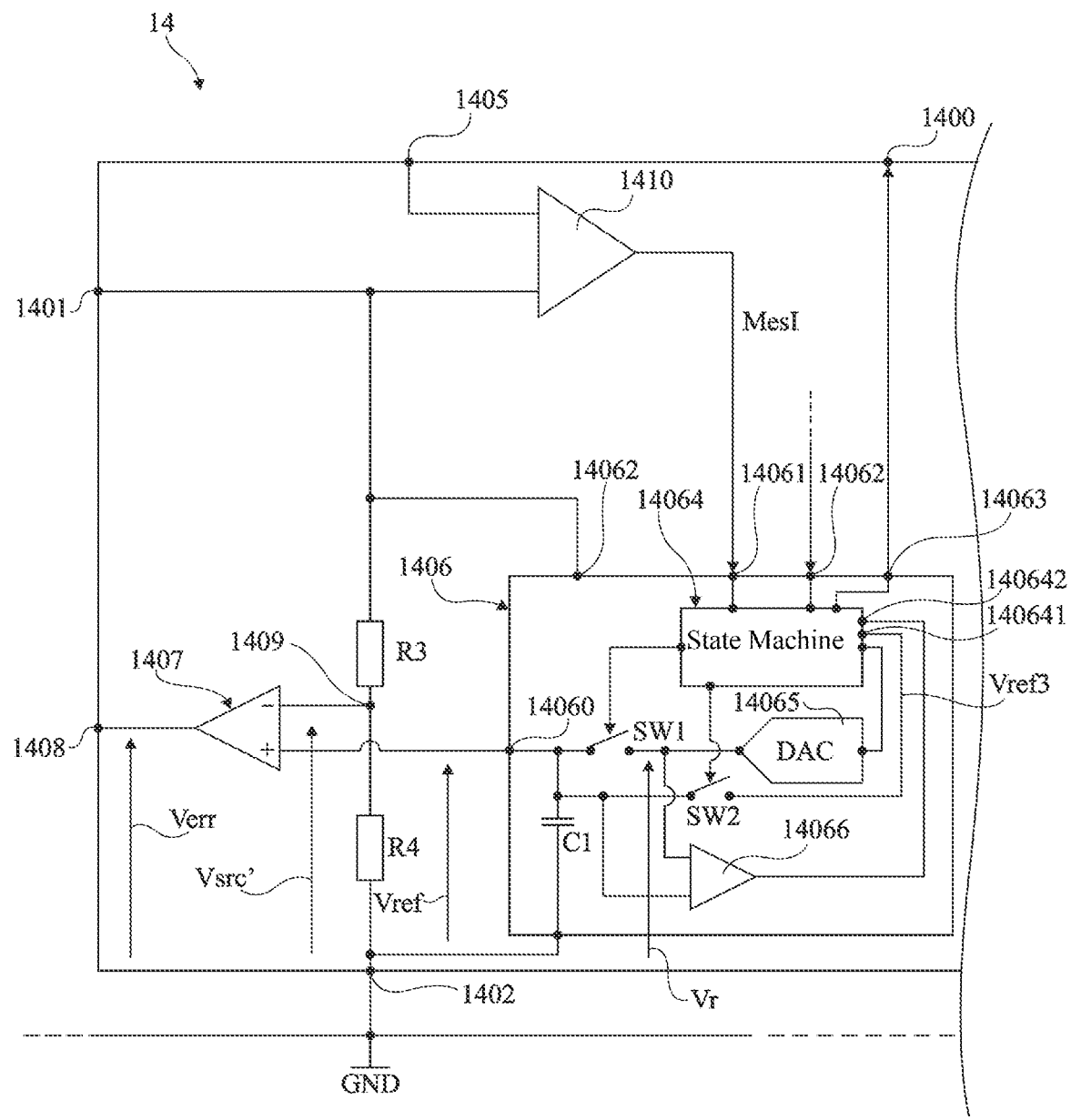
FIG. 4 shows in more detailed fashion an alternative embodiment of a portion of the power supply device of FIG. 2.

FIG. 4 shows in more detailed fashion a portion of interface 214 of FIG. 2 according to an alternative embodiment where the interface implements an operation at constant current. In FIG. 4, only a portion of unit 14 has been shown. Only the differences between unit 14 of FIG. 3 and unit 14 of FIG. 4 are here detailed.

In this alternative embodiment, unit 14 comprises amplifier 1410. As previously indicated, circuit 1406, for example, circuit 14064, is configured to adapt the value of voltage Vref according to the difference between current supplied by converter and current Imax, for example, to decrease the value of voltage Vref according to the difference between the current supplied by the converter 12 and current Imax when the current supplied by converter becomes greater than current Imax.

In this alternative embodiment, circuit 1406 comprises a terminal 14062 connected to terminal 1401 to receive voltage Vsrc. Although this is not shown, circuit 1406 comprises one or a plurality of comparators configured to compare voltage Vsrc with a low threshold and, possibly, with a high threshold. The high and low thresholds are determined by the selected predefined power, and more particularly by the corresponding predefined set point value of voltage Vsrc. As previously indicated, while a predefined value P1 is selected, when voltage Vsrc becomes smaller than the low threshold, circuit 1406, for example, circuit 14064, is configured to select a smaller set point value of voltage Vsrc, preferably the default set value.

In this alternative embodiment, a capacitor C1 is connected between terminals 14060 and 1402. Further, a switch SW1 is connected between terminal 14060 and the output of converter 14065, and a switch SW2 is connected between terminal 14060 and an output terminal 140641 of circuit 14064. When the current supplied by converter 12 becomes greater than current Imax, circuit 14064 is configured to supply a voltage at value Vref3 determined by the difference between the current supplied by converter 12 and current Imax. Preferably, circuit 14064 comprises an error amplifier (not shown in FIG. 4) between a signal representative of current Imax and a signal representative of the current supplied by converter 12, for example, signal MesI, the amplifier then supplying an output signal representative of the difference between current supplied by converter 12 and current Imax. Preferably, the error amplifier is configured to supply voltage Verf3 as output signal.

As will be seen in further detail hereafter, capacitor C1 enables to store voltage Vref at value Vref3, when the set point value of voltage Vsrc changes to set predefined set point value Vsrc2, after the low threshold has been exceeded by voltage Vsrc.

In this alternative embodiment, circuit 1406, for example, the state machine 14064, performs a comparison (not shown in FIG. 4) between a signal representative of voltage Vsrc and a signal representative of a low threshold of voltage Vsrc, determined by a selected predefined power.

In this alternative embodiment, circuit 1406 comprises a comparator 14066 configured to compare the voltage available at the output of DAC converter 14065 with voltage Vref across capacitor C1. The output of comparator 14066 is connected to a terminal 140642 of the state machine 14064.

In this alternative embodiment, circuit 1406, for example, the state machine 14064, is configured to control switches SW1 and SW2.

In operation, after predefined power P1 has been selected, circuit 1406 maintains switch SW1 on and switch SW2 off. Further, the state machine 14064 supplies converter 14065 with binary code B1, so that the converter imposes, across capacitor C1, a voltage Vref at value Vref1 representative of the corresponding predefined set point value Vsrc1 of voltage Vsrc.

When the output current of converter 12 (FIG. 2) becomes greater than current Imax determined by the selected predefined power P1, this is detected by the state machine 14064, particularly from signal MesI. The state machine 14064 then supplies, on its terminal 140641, a voltage at value Vref3 which depends on the difference between the current supplied by converter 12 and current Imax. The state machine 14064 also controls the turning off of switch SW1 and the turning on of switch SW2, whereby the value of voltage Vref across capacitor C1 is equal to Vref3. If, during the constant current regulation, voltage Vsrc becomes smaller than the low threshold, this is detected by the state machine 14064. The state machine 14064 controls the turning off of switch SW2. As a result, voltage Vref is stored across capacitor C1, and is equal to Vref3. The state machine 14064 then selects a predefined set point value Vsrc2 corresponding preferably to the default set point value.

The state machine 14064 then supplies converter 10465, as in the embodiment of FIG. 3, with the succession of binary codes B1, B, and B2. A voltage ramp Vr from value Vref1 to value Vref2 is then available on the output of converter 14065.

As long as the state machine 14064 receives from comparator 14066 a signal indicating that voltage Vref is smaller than voltage Vr, it maintains the two switches SW1 and SW2 off. Voltage Vref is then maintained at value Vref3.

As soon as the state machine 14064 receives from comparator 14066 a signal indicating that voltage Vref is equal to or greater than voltage Vr, it turns on switch SW1. Voltage Vr can then be found on capacitor C1. As a result, voltage Vref is equal to voltage Vr, and exhibits a voltage ramp from value Vref3 to value Vref2.

The specific example about how the state machine 14064 supplies binary codes to the DAC 14065 to generate the ramp Vr, which has been described in relation with the embodiment of FIG. 3 also applies to the embodiment of FIG. 4.

Various embodiments and variations have been described. It will be understood by those skilled in the art that certain features of these various embodiments and variations may be combined, and other variations will occur to those skilled in the art. In particular, although an embodiment at constant current where value Vref3 is stored across a capacitor C1, and then compared with voltage ramp Vr to provide a voltage ramp Vref from value Vref3 to value Vref2 has been described in relation with FIG. 4, other embodiments of circuit 1406 enabling to provide such a voltage ramp Vref may be provided. In particular, for an operation at constant current, it may be provided for circuit 1406 to comprise an analog-to-digital converter enabling to obtain a binary code B3 corresponding to value Vref3 at time when voltage Vsrc fall below the low threshold, such that, from this time, circuit 1064 successively supplies DAC converter 14065 with code B3, successive codes B, and code B2, codes B being between codes B3 and B2.

Finally, the practical implementation of the described embodiments and variations is within the abilities of those skilled in the art based on the functional indications given hereinabove. In particular, it is within the abilities of those skilled in the art, based on the above functional indications, to determine the slope of voltage Vref so that amplifier 1407 remains in a regulation operation, for example, by providing for voltage ramp Vref between the two values Vref1 and Vref2 or, if the interface operates in constant current, between the two values Vref3 and Vref2, to last for at least 1 ms, preferably at least 10 ms.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device comprising:
a voltage converter configured to supply, from a first voltage, a second voltage on an output terminal of the converter having a current value determined by a third voltage on a control terminal of the converter;
a ramp generation circuit configured, when a set point value of the second voltage switches from a first set point value to a second set point value smaller than the first set point value, to generate a first signal that includes a ramp successively representative of the first set point value, of a plurality of decreasing intermediate values between the first and second set point values, and of the second set point value;
an error amplifier configured to supply a second signal representative of a difference between the first signal and a third signal representative of the current value of the second voltage; and
a feedback control circuit configured to set the third voltage based on the second signal.

2. The device of claim 1, wherein the ramp generation circuit is configured to select the first and second set point values from a set of predefined set point values.

3. The device of claim 1, wherein the first set point value is smaller than a predefined set point value selected from a set of predefined set point values, the first set point value being determined from the selected predefined set point value, and the second set point value being selected from said set of predefined set point values.

4. The device of claim 3, wherein the ramp generation circuit is configured to select the first set point value from a difference between a current available on the output terminal of the converter and a predefined maximum current.

5. The device of claim 3, wherein said ramp generation circuit is configured, when the set point value of the second voltage switches from the first set point value to the second set point value, to:
store a fourth signal representative of the first set point value;
generate a fifth signal that includes a ramp successively representative of said selected predefined set point value, of a plurality of decreasing intermediate values between the selected predefined set point value and the second set point value, and of the second set point value; and
generate the first signal equal to the fourth signal until the fifth signal is equal to the fourth signal, and then equal to the fifth signal.

6. The device of claim 5, wherein the ramp generation circuit comprises a comparator configured to supply a sixth signal representative of the comparison of the fourth signal with the fifth signal.

7. The device of claim 6, wherein the ramp generation circuit is configured to generate the first signal from the fourth, fifth, and sixth signals.

8. The device of any of claim 1, wherein the feedback control circuit includes:
- a voltage dividing bridge connected between the output terminal of the converter and a node of application of a reference potential, an intermediate node of said voltage dividing bridge being connected to the control terminal of the converter; and
- a transistor is connected between the intermediate node of said voltage dividing bridge and the node of application of the reference potential, a control terminal of the transistor being configured to receive the second signal.

9. The device of claim 1, wherein the ramp generation circuit comprises a state machine and a digital-to-analog converter.

10. The device of claim 9, wherein the state machine is configured to, when the set point value of the second voltage switches from the first set point value to the second set point value, successively supply binary control codes to the digital-to-analog converter, said codes being representative respectively of the first set point value, of said decreasing intermediate values, and of the second set point value, the digital-to-analog converter having an output terminal configured to provide the first signal.

11. The device of claim 9, wherein:
said ramp generation circuit is configured, when the set point value of the second voltage switches from the first set point value to the second set point value, to:
- store a fourth signal representative of the first set point value;
- generate a fifth signal that includes a ramp successively representative of said selected predefined set point value, of a plurality of decreasing intermediate values between the selected predefined set point value and the second set point value, and of the second set point value; and
- generate the first signal equal to the fourth signal until the fifth signal is equal to the fourth signal, and then equal to the fifth signal; and the state machine is configured to, when the set point value of the second voltage switches from the first set point value to the second set point value, successively supply binary control codes to the digital-to-analog converter, said codes being representative respectively of said first set point value, of said plurality of decreasing intermediate values between the first set point value and the second set point value, and of the second set point value, the digital-to-analog converter having an output terminal configured to provide the fifth signal.

12. The device of claim 11, wherein the ramp generation circuit includes:
- a first switch coupling the output terminal of the digital-to-analog converter to a first internal node; and
- a capacitor connected to the first internal node; and
- a second switch coupling a second internal node to the first internal node, the first signal being available on the first internal node and the fourth signal being available on the second internal node.

13. The device of claim 12, wherein the state machine is configured to:
turn off the second switch when the set point value of the second voltage switches from the first set point value to the second set point value; and
turn on the first switch when the fifth signal becomes equal to the fourth signal.

14. A device comprising:
a power source configured to supply a first voltage;
a USB-C connector; and
a connection interface coupled between the power source and the USB-C connector, the connection interface including:
- a voltage converter configured to supply, from the first voltage, a second voltage on an output terminal of the converter having a current value determined by a third voltage on a control terminal of the converter, the output terminal of the converter being coupled to the USB-C connector;
- a ramp generation circuit configured, when a set point value of the second voltage switches from a first set point value to a second set point value smaller than the first set point value, to generate a first signal that includes a ramp successively representative of the first set point value, of a plurality of decreasing intermediate values between the first and second set point values, and of the second set point value;
- an error amplifier configured to supply a second signal representative of a difference between the first signal and a third signal representative of the current value of the second voltage; and
- a feedback control circuit configured to set the third voltage based on the second signal.

15. The device of any of claim 14, wherein the feedback control circuit includes:
- a voltage dividing bridge connected between the output terminal of the converter and a node of application of a reference potential, an intermediate node of said voltage dividing bridge being connected to the control terminal of the converter; and
- a transistor is connected between the intermediate node of said voltage dividing bridge and the node of application of the reference potential, a control terminal of the transistor being configured to receive the second signal.

16. The device of claim 14, wherein the ramp generation circuit comprises:
- a state machine configured to, when the set point value of the second voltage switches from the first set point value to the second set point value, successively supply binary control codes, said codes being representative respectively of the first set point value, of said decreasing intermediate values, and of the second set point value; and
- a digital-to-analog converter having an input terminal, configured to receive the binary control codes from the state machine, and an output terminal configured to provide the first signal.

17. The device of claim 14, wherein:
the first set point value is smaller than a predefined set point value selected from a set of predefined set point values, the first set point value being determined from the selected predefined set point value, and the second set point value being selected from said set of predefined set point values;
said ramp generation circuit is configured, when the set point value of the second voltage switches from the first set point value to the second set point value, to:
store a fourth signal representative of the first set point value;

generate a fifth signal that includes a ramp successively representative of said selected predefined set point value, of a plurality of decreasing intermediate values between the selected predefined set point value and the second set point value, and of the second set point value; and generate the first signal equal to the fourth signal until the fifth signal is equal to the fourth signal, and then equal to the fifth signal; and said ramp generation circuit includes:
- a state machine configured to, when the set point value of the second voltage switches from the first set point value to the second set point value, successively supply binary control codes, said codes being representative respectively of said first set point value, of said plurality of decreasing intermediate values between the first set point value and the second set point value, and of the second set point value; and
- a digital-to-analog converter having an input terminal, configured to receive the binary control codes from the state machine, and an output terminal configured to provide the fifth signal.

18. A method, comprising:

controlling a voltage converter supplying, from a first voltage, a second voltage having a current value determined by a third voltage, the controlling including, when a set point value of the second voltage switches from a first set point value to a second set point value smaller than the first set point value;

generating a first ramp signal successively representative of the first set point value, of a plurality of decreasing intermediate values in a range from the first and second set point values, and of the second set point value;

an error amplifier supplying a second signal representative of a difference between the first signal and a third signal representative of the current value of the second voltage; and determining the third voltage from the second signal.

19. The method of claim 18, wherein the first set point value is smaller than a predefined set point value selected from a set of predefined set point values, the first set point value being determined from the selected predefined set point value, and the second set point value being selected from said set of predefined set point values.

20. The method of claim 19, wherein the first set point value is further determined from a difference between a current available on the output terminal of the converter and a predefined maximum current.

\* \* \* \* \*